United States Patent
Danek et al.

(10) Patent No.: US 6,184,776 B1
(45) Date of Patent: Feb. 6, 2001

(54) ACCELERATOR MODULE FOR ELECTRIC VEHICLE

(75) Inventors: Daniel J. Danek, Berwyn; Mario Orrico, Chicago, both of IL (US)

(73) Assignee: Illinois Tool Works Inc., Glenview, IL (US)

(*) Notice: Under 35 U.S.C. 154(b), the term of this patent shall be extended for 0 days.

(21) Appl. No.: 09/270,666

(22) Filed: Mar. 16, 1999

(51) Int. Cl.$^7$ .................................................. H01C 10/50
(52) U.S. Cl. ...................... 338/198; 338/172; 338/182; 338/200; 200/61.89; 200/61.45 R
(58) Field of Search ..................... 338/198, 172, 338/184, 153, 200, 173, 210; 200/61.89, 61.45 R, 61.91, 61.88, 18

(56) References Cited

U.S. PATENT DOCUMENTS

| | | |
|---|---|---|
| 3,899,041 | 8/1975 | Mager . |
| 3,924,220 | 12/1975 | Matsui et al. . |
| 4,087,776 | 5/1978 | Donato . |
| 4,123,740 | 10/1978 | Palmer et al. . |
| 4,199,037 | 4/1980 | White . |
| 4,355,293 | 10/1982 | Driscoll . |
| 4,523,175 | 6/1985 | Sakurai . |
| 4,604,506 | 8/1986 | Gebhardt . |
| 4,654,626 | 3/1987 | Carsello . |
| 4,728,923 | 3/1988 | Finger . |
| 4,827,241 | 5/1989 | Riser et al. . |
| 4,928,227 | 5/1990 | Burba et al. . |
| 4,983,946 | 1/1991 | Kotaki et al. . |
| 5,004,873 * | 4/1991 | Schnut ................................ 200/83 |
| 5,023,414 | 6/1991 | Mihara et al. . |
| 5,086,785 | 2/1992 | Gentile et al. . |
| 5,148,883 | 9/1992 | Tanaka et al. . |
| 5,271,269 | 12/1993 | Rilling et al. . |
| 5,287,772 | 2/1994 | Aoki et al. . |
| 5,289,890 | 3/1994 | Toyoda et al. . |
| 5,359,308 | 10/1994 | Sun et al. . |
| 5,365,431 | 11/1994 | Minezawa et al. . |
| 5,389,825 | 2/1995 | Ishikawa et al. . |
| 5,440,087 | 8/1995 | Cobb, III . |
| 5,453,930 | 9/1995 | Imaseki et al. . |
| 5,525,768 | 6/1996 | Cobb, III et al. . |
| 5,920,048 * | 7/1999 | Crippen et al. ................ 200/61.89 |

* cited by examiner

Primary Examiner—Michael L. Gellner
Assistant Examiner—Richard K. Lee
(74) Attorney, Agent, or Firm—Schwartz & Weinrieb (57) ABSTRACT

An accelerator module for an electric vehicle has a pivotal actuator upon which is mounted a wiping element for wiping engagement with variable and constant resistance elements formed upon a printed circuit board mounted within a housing. A normally-open switch mechanism is also mounted upon the printed circuit board, and in order to delay the closure of the normally-open switch mechanism from its OPEN state to its CLOSED state, the actuator is provided with a spring-biased overtravel plunger mechanism which engages a push-button element of the switch mechanism so as to retain the switch in its OPEN state until the actuator has been moved a predetermined distance corresponding to a predetermined amount of depression of the accelerator pedal of the electric vehicle.

21 Claims, 3 Drawing Sheets

ACCELERATOR MODULE FOR ELECTRIC VEHICLE

CROSS-REFERENCE TO RELATED PATENT APPLICATIONS

This patent application is related to U.S. patent application Ser. No. 08/603,041 which was filed on Feb. 16, 1996 in the name of Randall M. Crippen et al. and which is entitled METHOD AND APPARATUS FOR AN ELECTRICAL SWITCH AND VARIABLE RESISTANCE MODULE and which is now U.S. Pat. No. 5,920,048 and U.S. patent application Ser. No. 08/878,313 which was filed on Jun. 18, 1997 in the name of Robert Dam et al., which is entitled ACCELERATOR MODULE, and which is now U.S. Pat. No. 5,824,979.

FIELD OF THE INVENTION

The present invention relates generally to electrical switches and variable electrical resistance mechanisms used in conjunction therewith, and more particularly to an electrical switch and variable electrical resistance mechanism which may be readily incorporated within an accelerator module utilized in connection with electric vehicles.

BACKGROUND OF THE INVENTION

Electrical switches and variable electrical resistance mechanisms are utilized in many different applications in order to, in effect, undergo and operatively sense or determine a positional change in response to movement of an operatively associated movable member, and furthermore, to provide or generate a corresponding electrical signal, indicative of such positional change, to an electrical controller. An exemplary use of such switches and variable electrical resistance mechanisms is in conjunction with an accelerator pedal of an electric vehicle whereupon depression of the accelerator pedal, the variable electrical resistance mechanism will generate an electrical signal which varies in proportion to the displacement or depression of the accelerator pedal which, of course, corresponds to the degree of acceleration desired by the vehicle operator.

The variable resistance mechanism, as is normally the case with a potentiometer or other similar variable electrical resistance devices or mechanisms, is mechanically linked to the movable member so as to sense or determine the displacement or movement of the movable member over a predetermined range of movement. More particularly, in the case of utilizing such a system in connection with an accelerator pedal of an electric vehicle, the aforenoted related U.S. patent application Ser. No. 08/603,041 discloses a system wherein a potentiometer shaft is operatively connected to an arm or the like which extends from the accelerator pedal so as to be rotated in response to the depression or displacement of the accelerator pedal, and a lever or actuator, carrying a wiper element for defining a wiping contact with respect to constant and variable electrical resistance elements disposed upon a printed circuit board of the electrical assembly, is provided upon the rotary shaft.

Figure 1:
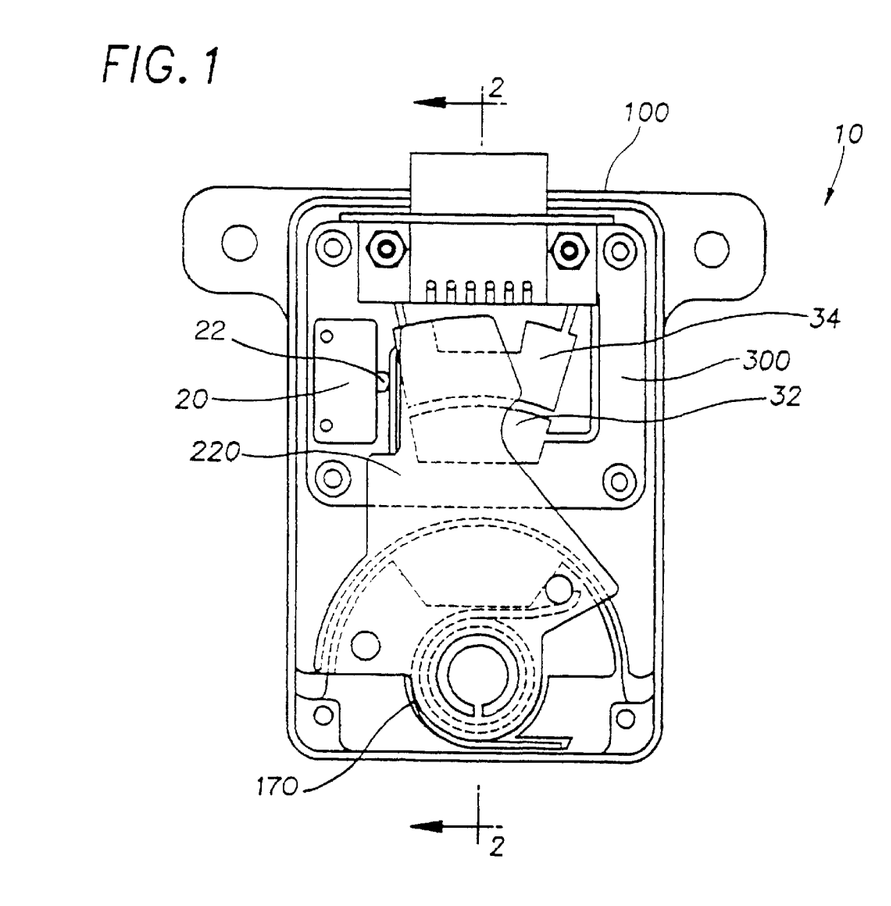
FIG. 1 is a front elevational view of an electric vehicle accelerator module, with one of the housing sections removed, constructed in accordance with the teachings and principles of the invention as set forth in the aforenoted related U.S. patent application Ser. No. 08/603,041, and showing the cooperative parts thereof, and within which the new and improved actuator body member of the present invention is able to be incorporated.
Figure 2:
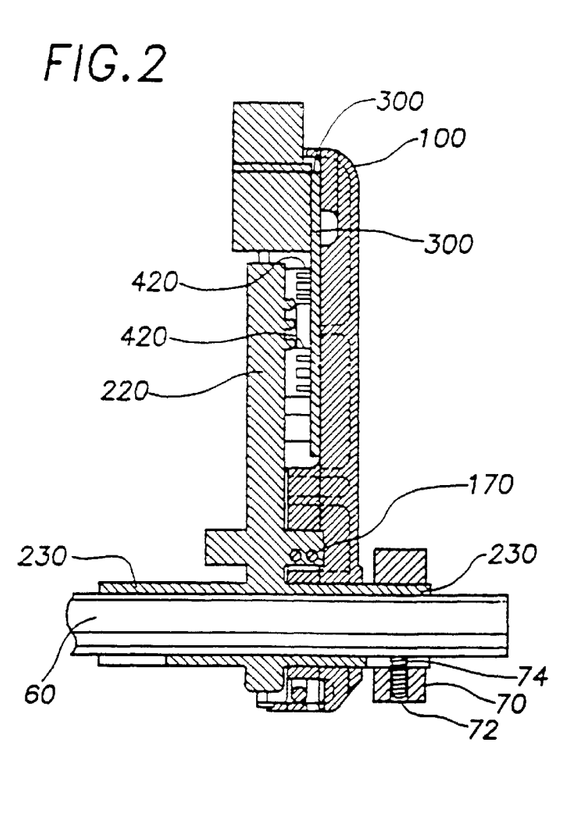
FIG. 2 is a cross-sectional view of the accelerator module shown in FIG. 1 as taken along lines 2—2 of FIG. 1.

The aforenoted system, more specifically disclosed within the aforenoted related U.S. patent application Ser. No. 08/603,041, is illustrated in FIGS. 1 and 2 of the drawings of the present patent application, wherein such drawing FIGS. 1 and 2 of the present patent application correspond to FIGS. 1 and 2 of the aforenoted related U.S. patent application Ser. No. 08/603,041 drawings, however, the details and description of the illustrated and disclosed system of the aforenoted related U.S. patent application Ser. No. 08/603,041 are only briefly described hereinbelow, and only the relevant component parts of the system have been designated by reference characters, as is necessary to the understanding of such a related system for background purposes of this patent application and the invention more fully described later herein. More particularly, the referenced system is generally indicated by the reference character 10 and comprises a normally-open switch 20 which is disposed within a housing 100, and a printed circuit board 300, upon which is disposed a constant electrical resistance element 32 and a variable electrical resistance element 34, which is also disposed within the housing 100. An actuator body member 220, which has mounted thereon wiper elements 420 for wipingly engaging the constant electrical resistance element 32 and the variable electrical resistance element 34, is pivotally disposed within the housing 100 as a result of being fixedly mounted upon a rotatable shaft 60 by means of a sleeve portion 230. The sleeve portion 230 of the actuator body member 220 is axially or longitudinally fixed upon or with respect to the shaft 60 by means of a collar 70 and a set screw 74, wherein the set screw 74 extends through a threaded bore 72 defined within the collar 70 so as to engage the shaft 60. The shaft 60 is, of course, operatively connected to the movable member or accelerator pedal, not shown. A torsion spring 170 biases the actuator body member 220 toward the position illustrated in FIG. 1 such that the actuator body member 220 is normally engaged with an actuator push-button 22 of the normally-open switch 20.

While the aforenoted system has in fact proven to be quite satisfactory from an operational point of view in that the same achieves its operational objectives in a reliable manner in order to properly control, for example, the acceleration mode requirements of the associated electric vehicle, it is often desirable, particularly in connection with the operation of electric vehicles, that the accelerator pedal be permitted to undergo a predetermined amount of limited travel or depression by the vehicle operator prior to electrical power actually being generated and delivered or transmitted to the drive train of the vehicle. Considered from a different operative perspective, it is desirable that the deliverance or transmission of actual electrical power to the vehicle drive train be effectively delayed for a predetermined amount of time after the accelerator pedal has undergone a predetermined amount of displacement, movement, or depression by the vehicle operator, wherein such predetermined amount of delayed power transmission time also encompasses a corresponding predetermined amount of pivotal or arcuate movement or displacement of the actuator body member and the wiper elements carried thereon with respect to the constant and variable electrical resistance elements of the printed circuit board prior to the closing of the normally-open switch mechanism. There are several reasons for achieving such a mode of operation. Firstly, such a mode of operation effectively limits any sudden "lurching" of the vehicle when the vehicle is initially moved from a stopped condition or state which would otherwise occur if electrical power is instantaneously transmitted or delivered to the vehicle drive train, without any predetermined delay, when the vehicle accelerator pedal is depressed by the vehicle operator. Viewed from a slightly different perspective, the incorporation of such a delay or operative mechanism within the vehicle comprises, in effect, a safety feature whereby acceleration or movement of the vehicle from a stopped position or condition cannot be inadvertently achieved merely as a result of incidental or limited contact or depression of the vehicle pedal. Secondly, such a mode of operation is desirable from an ergonomic point of view. Thirdly, such a mode of operation permits adjustability of the voltage signal output level as a function of the movement or depression of the vehicle accelerator pedal, and still further, or fourthly, such a mode of operation or use of such a delay or operative mechanism permits the pedal travel, movement, or depression to be adjusted or compensated for so as to permit the system to be operative in connection with different basic switch mechanisms or assemblies.

In addition to the foregoing, it sometimes happens that the normally-open switch mechanism will undergo or experience shock or impact forces if the accelerator pedal is suddenly or quickly released whereby the actuator body member is returned to its initial arcuate position and into engagement with the push-button element of the switch mechanism in a substantially rapid manner under the biasing influence of the torsion spring. Under such circumstances, it is possible that the normally-open switch mechanism could undergo or experience breakage, damage, distortion, and the like, and in a similar manner, stresses are likewise imposed upon the solder joints that secure the switch mechanism upon the printed circuit board.

A need therefore exists in the art for a new and improved accelerator module for an electric vehicle which incorporates therein a variable resistance control mechanism, assembly, or arrangement wherein the transmission of electrical power to the drive train of the electric vehicle is effectively delayed for a predetermined amount of time during which the vehicle accelerator pedal, and the actuator body member operatively connected thereto, can undergo an initial displacement or movement whereby accelerated movement of the electric vehicle from an initially stopped condition or state can be accomplished in accordance with a desired acceleration curve and in a safe manner, and in addition, impact, shock forces, and stresses, upon the switch mechanism, and its mounting joints upon the printed circuit board, can be effectively eliminated or substantially reduced.

OBJECTS OF THE INVENTION

Accordingly, it is an object of the present invention to provide a new and improved accelerator module for an electric vehicle.

Another object of the present invention is to provide a new and improved accelerator module for an electric vehicle which overcomes the various drawbacks and disadvantages characteristic of known electric vehicle accelerator modules.

An additional object of the present invention is to provide a new and improved accelerator module for an electric vehicle wherein transmission of electrical power to the vehicle drive train is effectively delayed a predetermined amount of time after the vehicle accelerator pedal is depressed and displaced or moved a predetermined distance as a result of the incorporation of a delay mechanism upon the actuator body member of the accelerator module.

A further object of the present invention is to provide a new and improved accelerator module for an electric vehicle wherein the delay mechanism of the actuator body member of the accelerator module also serves to provide shock absorption and impact protection for the normally-open switch mechanism of the accelerator module.

SUMMARY OF THE INVENTION

The foregoing and other objectives are achieved in accordance with the teachings of the present invention through the provision of a new and improved accelerator module for an electric vehicle wherein, as was the case of the accelerator module disclosed within the aforenoted U.S. patent application Ser. No. 08/603,041, the actuator body member is pivotally mounted upon the accelerator pedal input shaft, and the actuator body member has a wiper mechanism, comprising wiping elements, mounted thereon for wipingly engaging the variable and constant electrical resistance elements formed upon the printed circuit board, however, in lieu of the non-pivotal, distal end portion of the actuator body member directly engaging the normally-open switch mechanism when the vehicle accelerator pedal is not depressed, the actuator body member of the present invention is provided with a spring-biased plunger mechanism which is movable between two extreme positions depending upon the disposition of the actuator body member as a result of the depression or non-depression of the vehicle accelerator pedal.

As a result of the foregoing structure and system, when the vehicle accelerator pedal is initially depressed, the actuator body member is initially rotated or pivoted such that the wiping mechanism thereof begins to wipingly engage the constant and variable electrical resistance elements formed upon the printed circuit board in order to begin transmission of electrical power to the vehicle drive train, however, the spring-biased plunger mechanism is maintained engaged with the switch button of the normally-open switch mechanism under the biasing influence of the plunger mechanism coil spring so as to retain the normally-open switch mechanism in its normally OPEN state whereby actual transmission of electrical power to the vehicle drive train is delayed until the accelerator pedal, and the actuator body member operatively connected thereto, is pivotally moved or displaced a predetermined distance at which time the spring-biased plunger mechanism is physically disengaged from the switch button of the normally-open switch mechanism whereupon the normally-open switch mechanism is now disposed in its CLOSED state and electrical power is able to in fact be transmitted to the vehicle drive train.

As a result of the aforenoted structure, the desired acceleration curve of the electric vehicle is able to be accomplished in an ensured manner. In addition, in light of the interdisposition of the spring-biased plunger mechanism between the switch mechanism and the actuator body member, when the actuator body member is rapidly returned to its initial state under the influence of its biasing torsion spring, such as, for example, when the vehicle operator suddenly releases the accelerator pedal from its depressed state, the spring-biased plunger mechanism will absorb any shock or impact forces which would otherwise be impressed upon the switch mechanism thereby eliminating or substantially reducing severe damage to, or stress upon, the switch mechanism and its mounting upon the printed circuit board.

BRIEF DESCRIPTION OF THE DRAWINGS

Various other objects, features, and attendant advantages of the present invention will be more fully appreciated from the following detailed description when considered in connection with the accompanying drawings in which like reference characters designate like or corresponding parts throughout the several views, and wherein.

DETAILED DESCRIPTION OF THE PREFERRED EMBODIMENT

Figure 3:
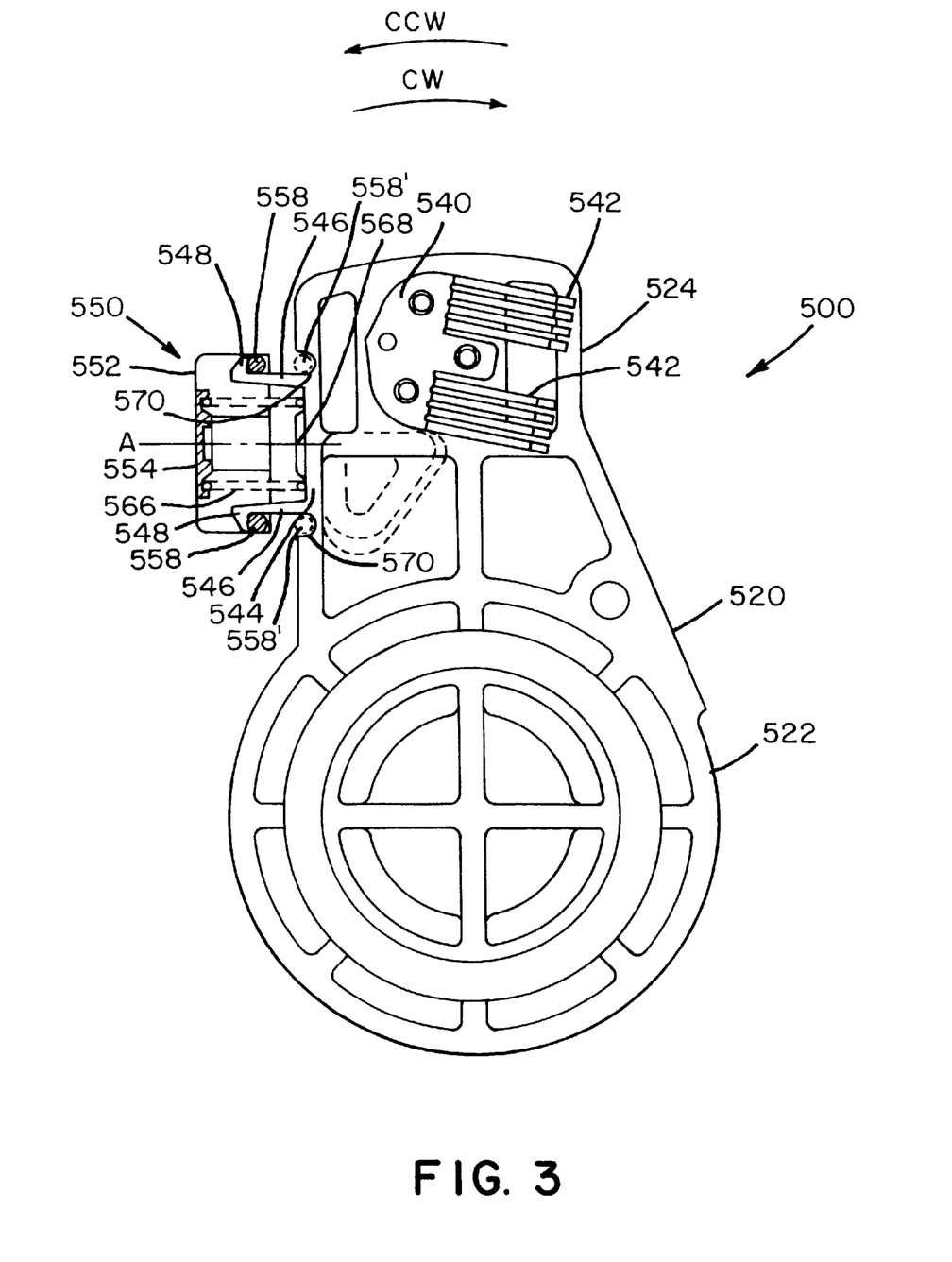
FIG. 3 is a front elevational view of the new and improved actuator body member which has been constructed in accordance with the principles and teachings of the present invention, and which may be incorporated within the accelerator module of FIG. 1.
Figure 5:
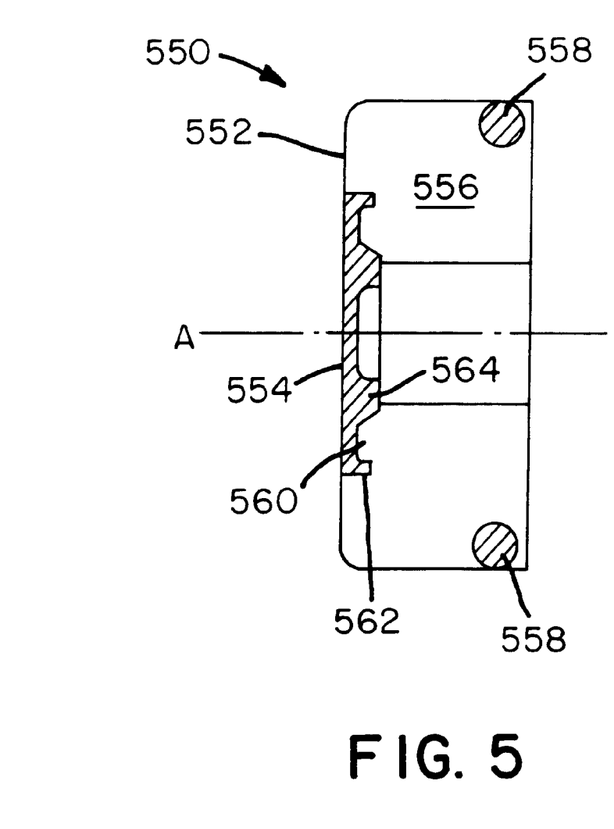
FIG. 5 is a cross-sectional view of the plunger mechanism of FIG. 4 as taken along the lines 5—5 of FIG. 4.

Referring now to the drawings, and more particularly to FIG. 3 thereof, a new and improved actuator, constructed in accordance with the principles and teachings of the present invention is disclosed as being generally similar to the actuator disclosed within FIGS. 1 and 2 of the drawings, is generally indicated by the reference character 500, and component parts thereof which are similar to corresponding component parts of the actuator disclosed within FIGS. 1 and 2 have been designated by corresponding reference characters except that the reference characters noted in FIG. 5 are in the 500 series.

More particularly, the actuator 500 comprises an actuator body member 520, and the actuator body member 520 comprises a hub portion 522 which is adapted to be rotatably or pivotally disposed within a housing similar to housing 100 of the accelerator module disclosed within FIG. 1, and which is also adapted to be operatively connected to an accelerator pedal, not shown, of an electric vehicle, also not shown, through means of a connecting shaft or the like similar to shaft 60 of the accelerator module shown in FIG. 2. A torsion spring, similar to the torsion spring 170 of the accelerator module of FIG. 1, is adapted to be operatively associated with the hub portion 522 so as to bias the actuator 500 toward its normal position at which a distal end portion 524 of the actuator body member 520 will normally engage a push-button element, similar to the push-button element 22 of a switch mechanism similar to the switch mechanism 20 of the accelerator module of FIG. 1, so as to maintain the switch mechanism in its normally-open state.

A wiper member 540, comprising a pair of wiping elements 542,542, is fixedly mounted upon the distal end portion 524 of the actuator body member 520 such that the wiping elements 542,542 can engage constant and variable electrical resistance elements, similar to the constant and variable electrical resistance elements 32 and 34 of FIG. 1, which are mounted upon a corresponding printed circuit board similar to the printed circuit board 300 of FIG. 1. The basic mode of operation of the acceleration module of the present invention, and including the actuator 500, is essentially the same as that disclosed within the aforenoted U.S. patent application Ser. No. 08/603,041, which mode of operation is hereby incorporated by reference, except as follows hereinafter with respect to the delayed closing of the normally-open switch mechanism and the corresponding delayed transmission of electrical power to the vehicle drive train as will now be discussed more fully in detail.

With reference now being made to FIG. 3, it is seen that the distal end portion 524 of the actuator body member 520 is provided with a support bracket section 544 from which a pair of vertically spaced support arms 546 project outwardly and transversely with respect thereto in a cantilevered manner. More particularly, each support arm 546 has a first proximal end which is integral with the bracket section 544 of the distal end portion 524 of the actuator body member 520, and a second distal end which is provided with a lip portion 548 for a purpose to be discussed hereinafter. As a result of the cantilevered structure of the support arms 546,546, and the fabrication of the actuator 500 from a suitable thermoplastic material, each of the support arms 546,546 is resiliently flexible.

Figure 4:
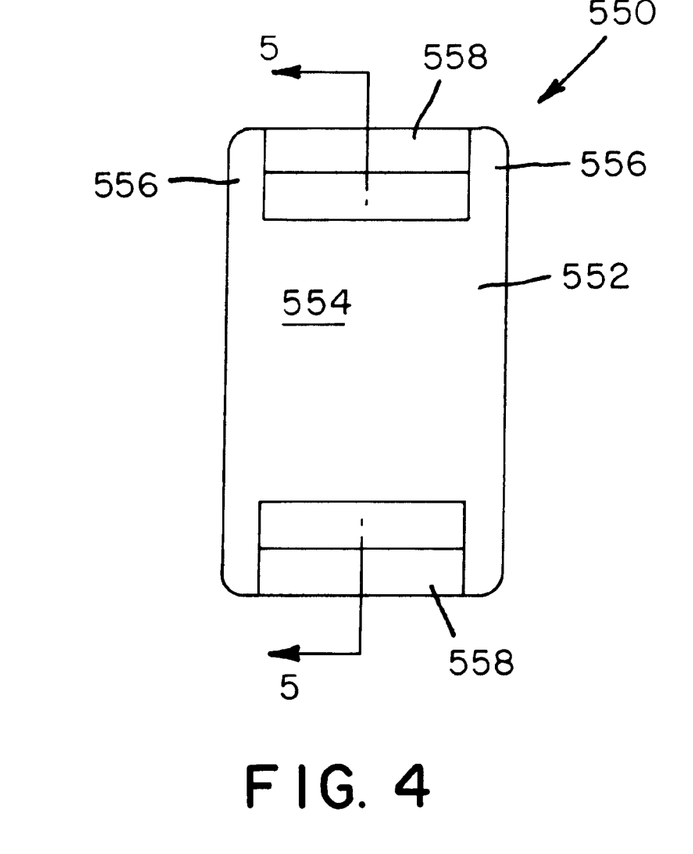
FIG. 4 is a front elevational view of plunger mechanism utilized in conjunction with the new and improved actuator body member of FIG. 3.

With additional reference now being made to FIGS. 4 and 5, a spring-biased plunger or over-travel mechanism is adapted to be mounted upon the support arms 546,546 of the actuator 500 such that the plunger mechanism will be interposed between the distal end portion 524 of the actuator 500 and the push-button element of the normally-open switch of the accelerator module of the present invention, which normally-open switch is similar to the switch 20 shown in FIG. 1 of the drawings. More particularly, the plunger mechanism of the present invention is generally indicated by the reference character 550 and is seen to comprise a substantially H-shaped housing 552.

The housing 552 comprises a front wall portion 554 and a pair of oppositely disposed side walls 556,556 which are integral with the front wall portion 554 and extend rearwardly therefrom. A pair of vertically spaced, transversely disposed rods or bars 558,558 are integral with the oppositely disposed side walls 556,556 and extend therebetween. The rearwardly disposed surface of front wall portion 554 is provided with an annular recessed portion 560, which is best seen in FIG. 5, and the annular recessed portion 560 in turn defines an annular, radially outer peripheral edge or lip 562 and an annular, radially inner boss section 564. With particular reference again being made to FIG. 3, it is appreciated that the foregoing structure of the front wall portion 554 of the housing 552 serves to seat one end of a coil spring 566, while the opposite end of the coil spring 566 is seated around a circular boss portion 568 which is formed upon the bracket section 544 of the distal end portion 524 of the actuator body member 520 between the vertically spaced support arms 546,546.

It is to be further appreciated that the plunger mechanism 550 is readily mounted upon the support arms 546,546 of the actuator body member 520 as a result of the transversely extending rods or bars 558,558 of the plunger mechanism 550 initially being engaged with the respective lip portions 548,548 of the arms 546,546 whereby, due to the chamfered configurations of the lip portions 548,548 of the arms 546,546, as well as the aforenoted resilient flexibility of the arms 546,546, the arms 546,546 will in effect be compressed inwardly toward each other so as to permit the rods or bars 558, 558 of the plunger mechanism 550 to in effect be snap-fitted over the lip portions 548,548 of the arms 546,546 whereupon the arms 546,546 can again expand outwardly so as to retain the plunger mechanism 550 thereon at the position shown in FIG. 3. The coil spring 566 of course serves to respectively bias and retain the plunger mechanism housing 552 toward and at the extended position shown in FIG. 3 with respect to the distal end portion 524 of the actuator body member 520 and the bracket section 544 thereof when the actuator body member 520 has been rotated or pivoted in the clockwise direction, as indicated by the arrow CW, by means of the vehicle accelerator pedal linkage system, not shown, and after the plunger mechanism 550 has been disengaged from the push-button element of the normally-open switch mechanism so as to permit the normally-open switch mechanism to move to its CLOSED state and thereby provide electrical power to the vehicle drive train.

In an opposite mode of operation, the plunger mechanism housing 552 is adapted to move toward the bracket section 544 of the distal end portion 524 of the actuator body member 520, and against the bias of the coil spring 566, and attain or be disposed at the dotted line positions designated by 558', when the coil spring 566 is axially compressed as a result of the actuator body member 520 being rotated or pivoted in the counterclockwise direction, indicated by the arrow CCW, under the influence of the torsion spring, similar to the torsion spring 170 shown in FIG. 1, when the vehicle accelerator pedal is no longer depressed and after the front wall 554 of the plunger mechanism housing 552 has engaged the push-button element of the normally-open switch mechanism so as to move the normally-open switch mechanism from its CLOSED position or state back to its normally OPEN state. It is noted that the bracket section 544 of the distal end portion 524 of the actuator body member 520 is provided with a pair of recessed regions 570,570 for accommodating the transversely disposed rods or bars 558, 558 of the plunger mechanism housing 552 when the plunger mechanism 550 is engaged with the push-button element of the normally-open switch mechanism. It is to be further appreciated that when the plunger mechanism 550 is engaged with the normally-open switch mechanism under the influence of the torsion spring biasing the actuator 500 in the counterclockwise direction CCW, the spring-biasing structure of the plunger mechanism housing 552 also serves to absorb shock or impact forces which would otherwise be deleteriously impressed upon the normally-open switch mechanism.

The operation and significance of the spring-biased plunger mechanism 550 of the present invention is submitted to be readily apparent, however, a brief description of such operation, and the significance thereof, will now be provided. It will be recalled that the objective of the present invention is to permit the actuator 500 to be initially moved a predetermined amount or angular extent in the clockwise direction CW, as a result of the depression of the vehicle accelerator pedal to which the actuator 500 is operatively connected in the aforenoted manner, prior to the closure of the switch mechanism and the transmission of electrical power to the electric vehicle drive train. Viewed from a different or opposite perspective, the transmission of electrical power to the vehicle drive train is to be effectively delayed until the actuator 500 has undergone a predetermined amount of rotational or pivotal displacement or movement corresponding to the depression of the vehicle accelerator pedal. In this manner, sudden "lurching" accelerations of the vehicle are effectively limited in their effect.

Accordingly, when the actuator 500 of FIG. 3 is, in effect, inserted into the housing 100 and substituted for the actuator 220 of FIG. 1, and the actuator 500 is rotatably or pivotally moved in the counterclockwise direction CCW under the biasing influence of the torsion spring 170, such as, for example, when the vehicle accelerator pedal is not depressed or is released from a previously depressed state, the front wall portion 554 of the plunger or over-travel mechanism 550 will initially engage the push-button element 22 of the normally-open switch mechanism 20 and depress or actuate the same so as to in fact place the switch mechanism 20 in its OPEN state.

However, due to the biasing effect of the torsion spring 170 acting upon the actuator 500, the movable mounting of the plunger or over-travel mechanism housing 552 upon the support arms 546, 546 in a substantially linear or axial manner along the axis A as seen in FIG. 3, and the engagement of the front wall portion 554 of the plunger or over-travel mechanism 550 with the push-button element 22 of the normally-open switch mechanism 20, continued arcuate movement of the actuator 500, under the biasing influence of torsion spring 170 and in the counterclockwise direction CCW, causes continued movement of the plunger or over-travel mechanism housing 552 whereby the latter is moved from its extreme left extended position illustrated in FIG. 3 toward its extreme right depressed position, against the biasing force of its coil spring 566, such that the bars or rods 558,558 slide or move along the support arms 546, 546 of the actuator bracket section 544 and attain the dotted line positions 558',558'. The push-button element 22 of the normally-open switch 20 of course remains engaged by the front wall portion 554 of the plunger or over-travel mechanism housing 552 and the normally-open switch 20 correspondingly remains in its normally OPEN state.

When the vehicle accelerator pedal is again depressed and the actuator 500 is rotatably or pivotally moved in the clockwise direction CW, the distal end portion 524 of the actuator will undergo arcuate movement away from the normally-open switch mechanism 20, while at the same time, the plunger or over-travel mechanism housing 552 will begin to move, under the biasing influence of its coil spring 566, from its extreme right depressed position, at which the rods or bars thereof are shown at their dotted line positions 558',558', toward the extreme left extended position as illustrated in solid lines in FIG. 3. It will be appreciated, however, that at such time, or during such movement, the front wall portion 554 of the plunger or over-travel mechanism housing 552 is retained in its engaged state with the push-button element 22 of the normally-open switch mechanism 20 under the biasing influence of the coil spring 566 whereby the switch mechanism 20 is retained in its OPEN state. When, however, the vehicle accelerator pedal has been depressed further to a predetermined extent at which the actuator 500 attains a corresponding angular displacement position at which time the plunger or over-travel mechanism housing 552 has attained its fully extended position illustrated in FIG. 3 and has just become disengaged from the push-button element 22 of the normally-open switch mechanism 20, the latter will attain its CLOSED state and electrical power will be transmitted to the vehicle drive train.

Thus, it may be seen that in accordance with the teachings and principles of the present invention, as a result of the incorporation of the plunger or over-travel mechanism 550 within the switch actuation system of the vehicle accelerator module, the vehicle accelerator pedal is permitted to be depressed and undergo a predetermined amount of movement or displacement before electrical power is actually transmitted to the vehicle drive train. Considered from an opposite viewpoint, by incorporating the plunger or over-travel mechanism 550 within the switch actuation system of the electric vehicle accelerator module, the transmission of electrical power to the vehicle drive train is delayed a predetermined amount of time until the accelerator pedal has been depressed to a predetermined degree. In addition, the movable mounting of the plunger or over-travel mechanism 550 upon the actuator 500 under the biasing influence of the coil spring 566 serves to dampen or absorb any shock or impact forces which would otherwise be impressed upon the push-button element 22 of the normally-open switch mechanism 20, as well as upon the switch mechanism 20 per se and its mountings upon the printed circuit board 300, when the actuator 500 was returned to its normal position under the influence of the torsion spring 170 when the vehicle accelerator pedal was no longer depressed or released.

Obviously, many variations and modifications of the present invention are possible in light of the above teachings. It is therefore to be understood that within the scope of the appended claims, the present invention may be practiced otherwise than as specifically described herein.

What is claimed as new and desired to be protected by Letters Patent of the United States of America is:

1. Apparatus for actuating an electrical switch and providing a variable electrical resistance useable to control electrical power, comprising:

a housing;

an electrical switch disposed within said housing and having OPEN and CLOSED states;

an actuator, comprising a body member, and a cylindrical sleeve member defining a pivot axis within said housing, such that said body member of said actuator is pivotally mounted with respect to said housing and about said axis of said cylindrical sleeve member;

spring means for biasing said actuator toward an initial position at which said body member of said actuator engages said electrical switch so as to dispose said electrical switch in said OPEN state, and for permitting pivotal movement of said body member away from said electrical switch and against the biasing force of said spring means in response to movement of said actuator by a movable member so as to permit said body member of said actuator to be disengaged from said electrical switch whereby said electrical switch can change states from said OPEN state to said CLOSED state;

a variable electrical resistor disposed within said housing;

an electrically conductive wiper mounted upon said body member of said actuator and disposed in contact with said variable electrical resistor disposed within said housing such that when said body member of said actuator is pivoted away from said electrical switch and against said biasing force of said spring means, variable electrical resistance is developed as a function of the disposition of said electrically conductive wiper along said variable electrical resistor; and means movably mounted upon one of said body member of said actuator and said electrical switch for permitting said body member of said actuator to move a predetermined distance away from said electrical switch, and against said biasing force of said spring means, prior to said body member of said actuator being operatively disengaged from said electrical switch so as to retain said electrical switch in said OPEN state until said body member of said actuator has been moved said predetermined distance away from said electrical switch, and for permitting said electrical switch to change states from said OPEN state to said CLOSED state, and thereby provide said variable electrical resistance, only after said body member of said actuator has been moved said predetermined distance away from said electrical switch.

2. Apparatus as set forth in claim 1, wherein:

said means operatively associated with said body member of said actuator and said electrical switch comprises a spring-biased plunger overtravel mechanism.

3. Apparatus as set forth in claim 2, wherein:

said spring-biased plunger overtravel mechanism is mounted upon said body member of said actuator.

4. Apparatus as set forth in claim 3, wherein:

said body member of said actuator comprises a pair of bracket support arms upon which said spring-biased plunger overtravel mechanism is mounted.

5. Apparatus as set forth in claim 4, wherein said spring-biased plunger overtravel mechanism comprises:

a substantially H-shaped housing comprising a front wall portion for engaging said electrical switch, a pair of oppositely disposed side walls integral with said front wall portion, and a pair of transversely disposed rods interconnecting said oppositely disposed side walls and mounted upon said bracket support arms of said body member of said actuator; and spring means, interposed between said body member of said actuator and said front wall portion of said housing, for biasing said housing toward said electrical switch and for retaining said front wall portion of said housing engaged with said electrical switch until said body member of said actuator has been moved said predetermined distance away from said electrical switch so as to be operatively disengaged from said electrical switch.

6. The apparatus as set forth in claim 1, wherein:

said variable electrical resistor comprises a variable resistance element and a constant resistance element; and said electrically conductive wiper comprises a first set of electrically conductive prongs disposed in contact with said variable resistance element, and a second set of electrically conductive prongs disposed in contact with said constant resistance element so as to define an electrical connection between said variable resistance element and said constant resistance element.

7. The apparatus as set forth in claim 6, wherein:

said variable resistance element and said constant resistance element both comprise conductive ink compositions.

8. In combination with an electric vehicle, apparatus for actuating an electrical switch and providing a variable electrical resistance useable to control electrical power for an electric vehicle, comprising:

a housing;

an electrical switch disposed within said housing and having OPEN and CLOSED states;

an actuator, comprising a body member, and a cylindrical sleeve member defining a pivot axis within said housing, such that said body member of said actuator is pivotally mounted with respect to said housing and about said axis of said cylindrical sleeve member;

spring means for biasing said actuator toward an initial position at which said body member of said actuator engages said electrical switch so as to dispose said electrical switch in said OPEN state, and for permitting pivotal movement of said body member away from said electrical switch and against the biasing force of said spring means in response to movement of said actuator by a movable member of said electric vehicle so as to permit said body member of said actuator to be disengaged from said electrical switch whereby said electrical switch can change states from said OPEN state to said CLOSED state;

a variable electrical resistor disposed within said housing;

an electrically conductive wiper mounted upon said body member of said actuator and disposed in contact with said variable electrical resistor disposed within said housing such that when said body member of said actuator is pivoted away from said electrical switch and against said biasing force of said spring means, variable electrical resistance is developed as a function of the disposition of said electrically conductive wiper along said variable electrical resistor; and means movably mounted upon one of said body member of said actuator and said electrical switch for permitting said body member of said actuator to move a predetermined distance away from said electrical switch, and against said biasing force of said spring means, prior to said body member of said actuator being operatively disengaged from said electrical switch so as to retain said electrical switch in said OPEN state until said body member of said actuator has been moved said predetermined distance away from said electrical switch, and for permitting said electrical switch to change states from said OPEN state to said CLOSED state, and thereby provide said variable electrical resistance, only after said body member of said actuator has been moved said predetermined distance away from said electrical switch.

9. Apparatus as set forth in claim 8, wherein:

said means operatively associated with said body member of said actuator and said electrical switch comprises a spring-biased plunger overtravel mechanism.

10. Apparatus as set forth in claim 9, wherein:

said spring-biased plunger overtravel mechanism is mounted upon said body member of said actuator.

11. Apparatus as set forth in claim 10, wherein:

said body member of said actuator comprises a pair of bracket support arms upon which said spring-biased plunger overtravel mechanism is mounted.

12. Apparatus as set forth in claim 11, wherein said spring-biased plunger overtravel mechanism comprises:

a substantially H-shaped housing comprising a front wall portion for engaging said electrical switch, a pair of op5 oppositely disposed side walls integral with said front wall portion, and a pair of transversely disposed rods interconnecting said oppositely disposed side walls and mounted upon said bracket support arms of said body member of said actuator; and spring means, interposed between said body member of said actuator and said front wall portion of said housing, for biasing said housing toward said electrical switch and for retaining said front wall portion of said housing engaged with said electrical switch until said body member of said actuator has been moved said predetermined distance away from said electrical switch so as to be operatively disengaged from said electrical switch.

13. The apparatus as set forth in claim 18, wherein:

said variable electrical resistor comprises a variable resistance element and a constant resistance element; and said electrically conductive wiper comprises a first set of electrically conductive prongs disposed in contact with said variable resistance element, and a second set of electrically conductive prongs disposed in contact with said constant resistance element so as to define an electrical connection between said variable resistance element and said constant resistance element.

14. The apparatus as set forth in claim 13, wherein:

said variable resistance element and said constant resistance element both comprise conductive ink compositions.

15. Apparatus for actuating an electrical switch and providing a variable electrical resistance useable to control electrical power, comprising:

a housing;

an electrical switch disposed within said housing and having OPEN and CLOSED states;

an actuator, comprising a body member, and a cylindrical sleeve member defining a pivot axis within said housing, such that said body member of said actuator is pivotally mounted with respect to said housing and about said axis of said cylindrical sleeve member;

spring means for biasing said actuator toward an initial position at which said body member of said actuator engages said electrical switch so as to dispose said electrical switch in said OPEN state, and for permitting pivotal movement of said body member away from said electrical switch and against the biasing force of said spring means in response to movement of said actuator by a movable member so as to permit said body member of said actuator to be disengaged from said electrical switch whereby said electrical switch can change states from said OPEN state to said CLOSED state;

a variable electrical resistor disposed within said housing;

an electrically conductive wiper mounted upon said body member of said actuator and disposed in contact with said variable electrical resistor disposed within said housing such that when said body member of said actuator is pivoted away from said electrical switch and against said biasing force of said spring means, variable electrical resistance is developed as a function of the disposition of said electrically conductive wiper along said variable electrical resistor; and means movably mounted upon one of said body member of said actuator and said electrical switch for retaining said electrical switch in said OPEN state and for delaying the closure of said electrical switch from said OPEN state to said CLOSED state, and thereby the generation of said variable electrical resistance, until said body member of said actuator has been moved a predetermined distance away from said electrical switch, against said biasing force of said spring means, and has been operatively disengaged from said electrical switch, whereby said variable electrical resistance is generated only after said body member of said actuator has been moved said predetermined distance away from said electrical switch.

16. Apparatus as set forth in claim 15, wherein:

said means operatively associated with said body member of said actuator and said electrical switch comprises a spring-biased overtravel plunger mechanism.

17. Apparatus as set forth in claim 16, wherein:

said spring-biased overtravel plunger mechanism is mounted upon said body member of said actuator.

18. Apparatus as set forth in claim 17, wherein:

said body member of said actuator comprises a pair of bracket support arms upon which said spring-biased overtravel plunger mechanism is mounted.

19. Apparatus as set forth in claim 18, wherein said spring-biased overtravel plunger mechanism comprises:

a substantially H-shaped housing comprising a front wall portion for engaging said electrical switch, a pair of oppositely disposed side walls integral with said front wall portion, and a pair of transversely disposed rods interconnecting said oppositely disposed side walls and mounted upon said bracket support arms of said body member of said actuator; and spring means, interposed between said body member of said actuator and said front wall portion of said housing, for biasing said housing toward said electrical switch and for retaining said front wall portion of said housing engaged with said electrical switch until said body member of said actuator has been moved said predetermined distance away from said electrical switch so as to be operatively disengaged from said electrical switch.

20. The apparatus as set forth in claim 15, wherein:

said variable electrical resistor comprises a variable resistance element and a constant resistance element; and said electrically conductive wiper comprises a first set of electrically conductive prongs disposed in contact with said variable resistance element, and a second set of electrically conductive prongs disposed in contact with said constant resistance element so as to define an electrical connection between said variable resistance element and said constant resistance element.

21. The apparatus as set forth in claim 20, wherein:

said variable resistance element and said constant resistance element both comprise conductive ink compositions.

* * * * *